Dec. 21, 1943.                    J. HICKEY                         2,337,194
                              PARKING INDICATOR
                           Filed May 23, 1942              3 Sheets-Sheet 1
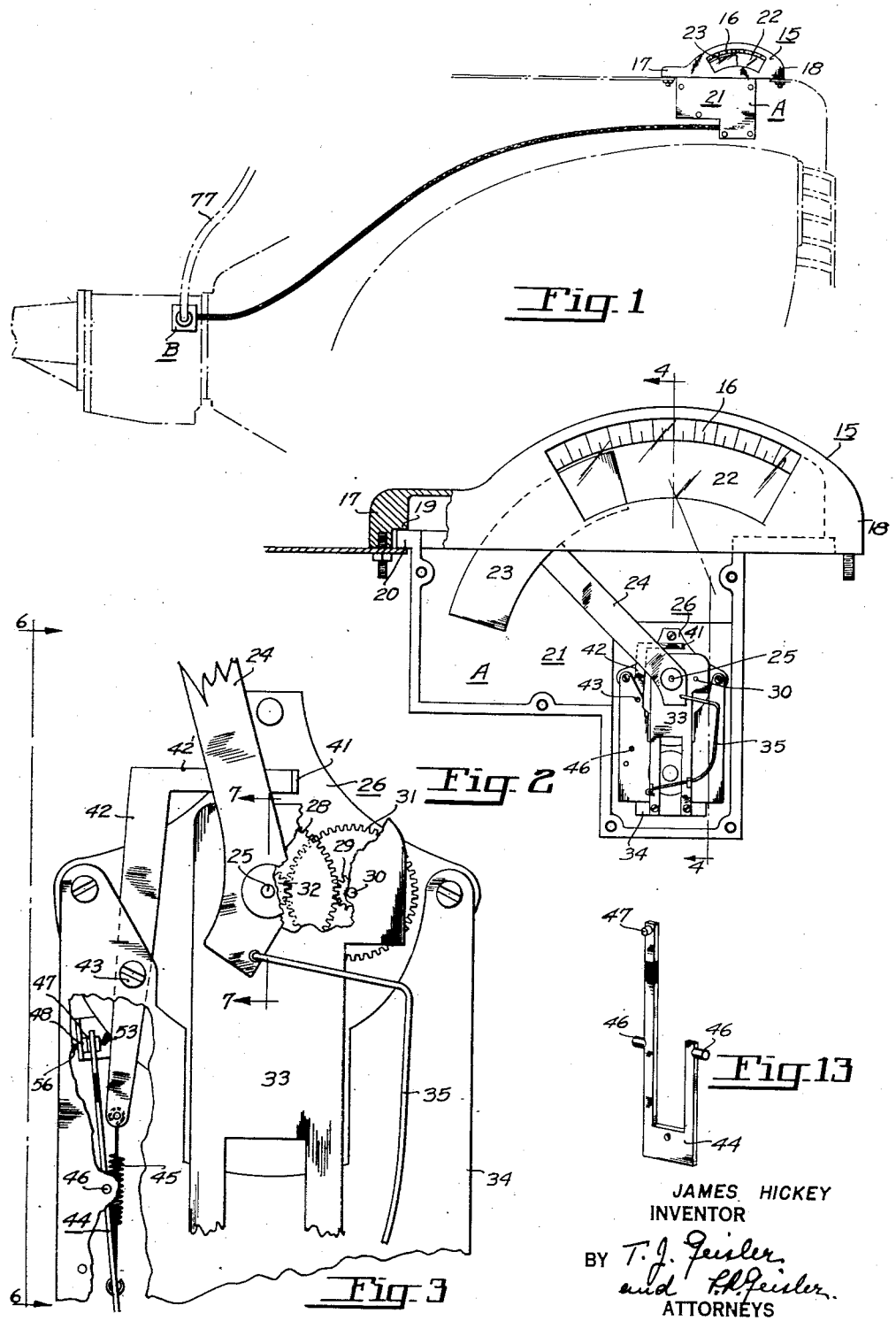
JAMES HICKEY
INVENTOR
BY T. J. Geisler
and F. R. Geisler
ATTORNEYS Dec. 21, 1943.                J. HICKEY                    2,337,194
                         PARKING INDICATOR
            Filed May 23, 1942              3 Sheets-Sheet 2

JAMES HICKEY
INVENTOR

BY
ATTORNEYS

Dec. 21, 1943.    J. HICKEY    2,337,194
PARKING INDICATOR
Filed May 23, 1942    3 Sheets-Sheet 3

JAMES HICKEY
INVENTOR.

BY T. J. Geisler
and F. K. Geisler.
ATTORNEYS

Patented Dec. 21, 1943

2,337,194

UNITED STATES PATENT OFFICE 2,337,194

PARKING INDICATOR

James Hickey, Portland, Oreg.

Application May 23, 1942, Serial No. 444,224

10 Claims. (Cl. 161—15)

This invention relates to parking time indicators, of the general type described in my copending applications, Ser. No. 363,165, filed under date of October 28, 1940 (now U. S. Patent No. 2,289,362, issued July 14, 1942), Ser. No. 406,989, filed under date of August 15, 1941 (now U. S. Patent No. 2,302,218, issued Nov. 17, 1942), and Ser. No. 427,476, filed under date of January 20, 1942, which are intended to be carried on a vehicle and to indicate from outside the vehicle the length of time, up to a predetermined maximum period, during which the vehicle has been parked in any one location without being moved.

In the previous parking indicators of this type which I have invented, and which are described in the above-mentioned pending patent applications, spring-actuated clockwork mechanisms are used as the means for operating the parking time indicators. Accordingly in such devices it has been necessary to provide additional means for automatically winding the spring of the clockwork mechanism whenever such winding becomes necessary, to insure continuous functioning of the device.

An object of the present invention is to provide a vehicle parking indicator, of the type indicated, which will be entirely electrically-operated and driven by electrical energy from the vehicle battery.

Another object of this invention is to provide an electrically-operated parking indicator which will function entirely automatically.

A further object of this invention is to provide an automatic, electrically-operated parking indicator, connected with the vehicle battery but so arranged that no current will be consumed by the device when the vehicle is parked longer than the maximum period without being moved, and also so arranged that no current will be consumed by the device at any time during which the vehicle is being driven at more than a predetermined minimum speed.

These and other objects I accomplish by including in my parking indicator an electric clockwork mechanism of ordinary construction with which to operate the indicating means, and by controlling the passage of current from the vehicle battery to such electric mechanism through the medium of a governor control operated in turn from the speedometer drive of the vehicle, and finally by combining other simple means as hereinafter described. In the following description of my invention reference is made to the accompanying drawings in which:

Fig. 1 is a side elevation of the parking indicator assembly and governor housing, the indicator being shown in position on the hood of an automobile and the governor housing being shown located adjacent the automobile transmission;

Fig. 2 is a side elevation, drawn to larger scale, of the parking indicator assembly with the cover plate removed from the mechanism housing;

Fig. 3 is a fragmentary side elevation, drawn to a still larger scale, of a portion of the mechanism which operates to move the indicator;

Fig. 13 is a perspective view of a toggle switch associated with the indicator mechanism.

Referring first to Fig. 1, the parking indicator assembly A and a governor control assembly B are located at different places in the vehicle but are connected by suitable electric conductors.

The parking indicator assembly A is preferably mounted upon the hood of the vehicle, although it may be mounted upon a fender or other suitable location. The governor assembly B is mounted on the transmission at the place where the speedometer cable is connected and is adapted to be actuated by the speedometer drive means.

Figure 4:
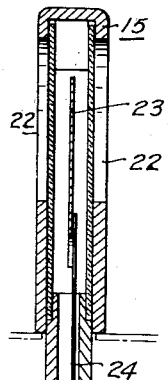
Fig. 4 is a vertical transverse section of the parking indicator assembly, showing the relation of the elements when the automobile is stopped and the device is indicating time parked.

The parking indicator assembly, shown in detail in Figs. 2 to 7 incl., will be described first. The indicator comprises a narrow ornamental housing 15, the lower edge of which is straight and the upper edge of which may be shaped as shown. The ends 17 and 18 (Fig. 2) of the housing have shouldered recesses or steps 19 formed therein which are adapted to receive the end flanges 20 of the mechanism housing 21. The base of the housing 15 is rectangular in plan and is slightly larger all around than the upper portion of the mechanism housing 21 (Figs. 2 and 4). In this way when the assembly is in place on the hood of the vehicle the base of the housing 15 will extend over the edge of the opening in the hood, thus completely covering the opening and producing a neat appearance.

The two indicating sides of the ornamental housing 15 each have an arcuate window 22. The windows are the same size and are in registration with each other. Time indicating indicia 16 is placed at the upper arcuate edges of the windows. An indicating segment 23 is secured upon an arm 24 which arm is journalled for rotation upon the shaft 25 of the mechanism. The size and contour of the segment 23 is such as to cause the segment to obstruct the windows 22 progressively as the segment moves in a clockwise direction (as viewed in Figures 1 and 2).

An electric clockwork mechanism 26 is secured within the housing 21 by suitable means such as the bolts and nuts 26' (Fig. 4). The electric clockwork mechanism need not be described as it is of the standard type used in ordinary electric clocks and is adapted to be driven by energy from the vehicle battery (not shown) in the usual manner.

Figures 6, 7, 11:
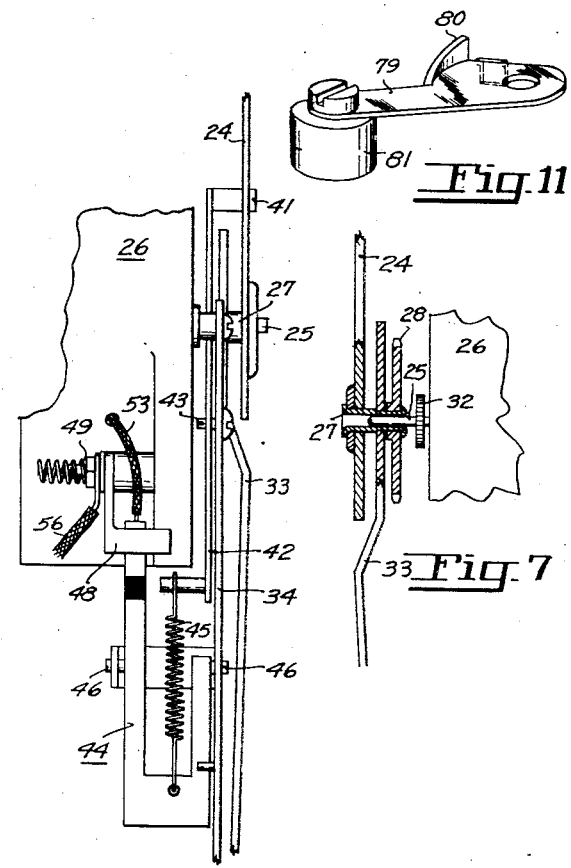
Fig. 6 is a fragmentary elevation from the opposite end of the mechanism, corresponding to line 6—6 of Fig. 3, and showing the switch for stopping the mechanism after a predetermined period for parking has elapsed.
Fig. 7 is a fragmentary section corresponding to line 7—7 of Fig. 3.
Fig. 11 is a perspective view of one of the weighted governor arms.

The arm 24, which carries the indicating segment 23, is journalled upon the shaft 25 of the electric clock mechanism as shown in Figs. 4 and 7. A shouldered sleeve or bushing 27 is rotatably disposed and slidable axially upon the shaft 25 (Fig. 7). The arm 24 is fixedly secured to the sleeve 27. A gear 28 is fixedly secured to the opposite end of the sleeve 27 (see also Fig. 3) and meshes with a pinion 29 which is journalled upon a shaft 30. A gear 31, which is integral and concentric with the pinion 29, is adapted normally to engage the driven gear 32 (Figs. 3 and 7) secured to the shaft 25 of the electric clockwork mechanism.

The sleeve or bushing 27, pinion 29, and gear 31, are rotatably supported on a throw-out spring bracket arm 33. The bracket arm 33 is secured at the bottom to a frame plate 34 which in turn is secured to the casing of the electric clockwork mechanism. The bracket arm 33 exerts a spring tension normally to hold the gear 31 in mesh with the gear 32. When the gear 31 is in mesh with the gear 32 rotation of the shaft 25 causes rotation of the sleeve 27 and therewith of the arm 24 thus causing the indicating segment 23 to move progressively across the windows 22.

The segment-carrying arm 24 is slightly restrained against rotation by a resilient member 35 (Figs. 2 and 3) which is attached at one end to the arm 24 and has its other end secured on the bracket arm 33.

The upper end of the throw-out bracket arm 33, on which the sleeve or bushing 27 is supported, can be pushed outwardly away from the frame plate 34 by means of a solenoid 38 and a movable plate 39. When the solenoid 38 is energized (see Figs. 4 and 5) the movable plate 39 is pulled against the solenoid and pushes against a rod 40 attached to the bracket arm 33, which pushes the upper end of the bracket arm 33 from the normal position shown in Fig. 4 to the disengaging position shown in Fig. 5. Since the gears 28, 29 and 31 move with the bracket arm 33, the gear 31 will be disengaged from the gear 32 when the solenoid 38 is energized. Whenever this occurs the spring 35 causes the arm 24 and indicating segment 23 to return to the normal starting position.

The solenoid 38, in a manner to be explained later, is energized only when the vehicle is in motion. When the vehicle is not in motion the operation of the electric clockwork mechanism, producing rotation of the gear 32, will cause the arm 24 and indicating segment 23 to move gradually towards the right as viewed in Figs. 1 and 2.

The solenoid 38 is connected with conductor 55 (Fig. 4) by means of a contact terminal 50, supported on an insulated bracket 51, and an intermediary connecting wire 52. Another conductor 56 is connected to a contact terminal 49 (Fig. 6) to which the electric clockwork mechanism is connected by means of conductor wire 53 and a toggle switch 44. Both the solenoid 38 and the electric clockwork mechanism are grounded to the vehicle frame. The conductors 55 and 56 are adapted to be connected with the vehicle battery under certain conditions through the intermediary of governor-controlled switches to be described later.

Referring to Figures 3, 6 and 13, a trip arm 42, pivotally mounted at 43 on the frame plate 34, has an upper lateral extension 42' located behind the segment-carrying arm 24 (as viewed in Fig. 3) which terminates in a forwardly-projecting ear 41 adapted to be engaged by the segment-carrying arm 24 as the latter nears the end of its predetermined travel. The opposite or bottom end of the trip arm 42 is connected by a spring 45 to a U-shaped switch bar 44 which is pivotally mounted intermediate its ends at 46.

A breaker point 48 (Fig. 6) is connected to the terminal 49 and is adapted to contact a corresponding breaker point 47 (Fig. 3) on the end of the switch bar 44 which in turn is connected by the wire 53 to the electric clockwork mechanism. The switch bar 44, trip arm 42, and spring 45 are so arranged that ordinarily these members will be held in the position shown in Fig. 3. However, when the segment-carrying arm 24 moves a predetermined distance in a clockwise direction (as viewed in Fig. 3), it will engage the projecting ear 41 of the trip arm 42, and further movement of the arm 24 will cause the trip arm 42 to be moved until the spring 45 is past the pivoted center of the switch bar 44, causing the breaker points 47 and 48 to be separated and shutting off further flow of current to the electric clockwork mechanism until the segment-carrying arm 24 is swung back and permits the trip arm 42 and switch bar 44 to return to normal position with the breaker point 47 again contacting the breaker point 48.

The governor assembly, referred to generally by reference character B, is shown in detail in Figs. 8 to 11 inclusive. It comprises a housing made in two halves 60 and 61 and secured together in any suitable manner. A cylindrical adapter assembly 62 is attached to the upper half 61 of the governor housing and is adapted, to have the speedometer cable connected thereto in the same manner in which the speedometer cable is ordinarily connected to the speedometer drive. The construction of the adapter assembly 62 is the same as that of the conventional speedometer adapter. The lower half 60 of the housing has a hub 73, a flanged member 90 secured therein, and a coupler 91 adapted to be attached to the conventional speedometer drive adapter housing on the vehicle transmission.

Electrical contact arms 63, 64, 65 and 66 are mounted in spaced relation in an insulating post 67 attached to the upper half 61 of the housing. These arms carry contact points at their free ends and contacts between them are opened or closed depending upon the position or movement of the actuating arm 64. The movable end of the actuating arm 64 is bent at right angles forming a downwardly-extending leg 68 which bears against a slidable disc 69. The conductors 55 and 56 (Fig. 4) are connected to the contact arms 63 and 66 respectively. A third conductor 70 connects the contact arm 65 to the vehicle battery 71. The actuating arm 64 acts as the means for closing the circuits through the arm 65 with either the arm 63 or the arm 66, or for preventing the closing of either or both of such circuits.

A shaft 72 extends through the lower half 60 of the housing and has its upper end 75 squared so as to engage the inner end of the shaft 74 of the adapter asesmbly 62 to which the conventional speedometer cable 77 (indicated by the broken line in Fig. 1) is connected. The opposite end of shaft 72 also has a squared end 76 adapted to be engaged by the conventional speedometer drive of the transmission.

Figure 10:
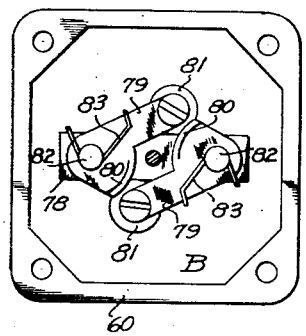
Fig. 10 is a plan view of one-half of the governor housing, corresponding to the line 10—10 of Fig. 8, but drawn to a smaller scale, showing the weighted governor arms therein but with the governor disc removed.
Figure 5:
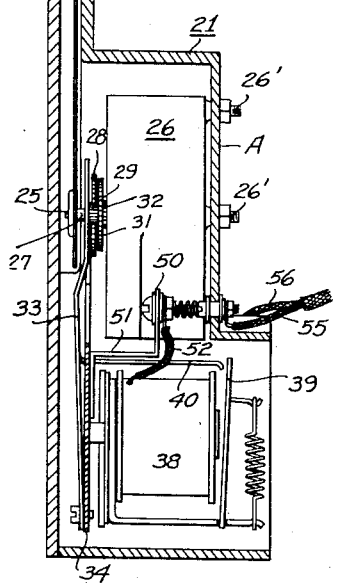
Fig. 5 is a fragmentary end elevation of the same mechanism within the housing showing the relation of the elements when the vehicle is traveling.

A bar 78 is fixedly secured to the shaft 72 and rotates therewith. A pair of weighted arms 79 are pivotally secured to the opposite ends of the bar 78 and have cam surfaces 80. One of these arms is shown in detail in Fig. 11. When the bar 78 is rotated at sufficient speed (for example, such speed as is produced when the vehicle moves at the rate of about 15 miles per hour), weights 81 at the ends of the arms 79, cause the arms to swing outwardly on their pivot pins 82 against the force of springs 83 (Fig. 10). This movement of the arms causes cam surfaces 80 to push a washer member 84 (Figs. 8 and 9) and the disc 69 upwardly on the shaft 72, and the disc 69 in turn pushes the contact arm 64 upwardly from the position shown in Fig. 8 to that shown in Fig. 9. However, as soon as the vehicle stops moving the rotation of the shaft 72 ceases and the arms 79, washer member 84, disc 69 and contact arms return to their normal position shown in Fig. 8.

Figure 12:
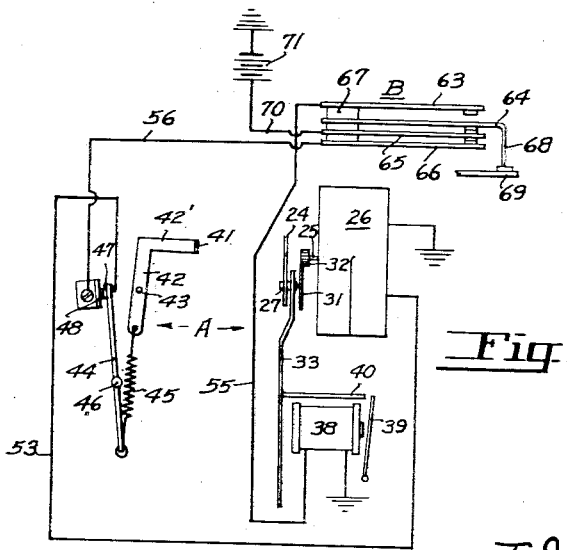
Fig. 12 is a diagrammatic layout of the electric circuits of the device illustrating the manner in which the elements are controlled through the electric circuits.

The operation of my device may now be explained briefly with particular reference to Fig. 12. Let it be assumed that the vehicle is at rest and the parking time is being indicated. Since the speedometer shaft drive is not rotating, the circuit from the vehicle battery 71 through the contact arms 65 and 66, conductor 56, and switch 44, to the electric clockwork mechanism will be closed, while the circuit to the solenoid 38 is open. Gears 32, 31, 29 and 28 will be rotated and the arm 24 and indicating segment 23 will gradually be moved in clockwise direction, (as viewed in Figs. 2 and 3) in the manner previously explained, and the segment 23 will gradually move across the windows in the housing on top of the vehicle hood. Should the vehicle remain parked longer than the predetermined time (for example, longer than two hours), the segment-carrying arm 24 will engage the ear 41 of the trip arm 42 and open the switch 44, thus interrupting the passage of current to the electric clockwork mechanism.

Figure 9A:
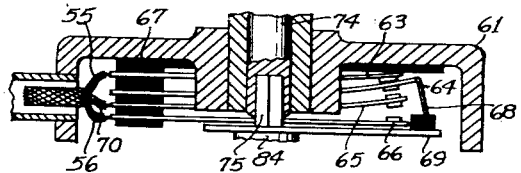
Fig. 9A is a fragmentary view corresponding in part to Fig. 9 and indicating the position of the contact arms when the vehicle is traveling at a higher rate of speed.
Figure 8:
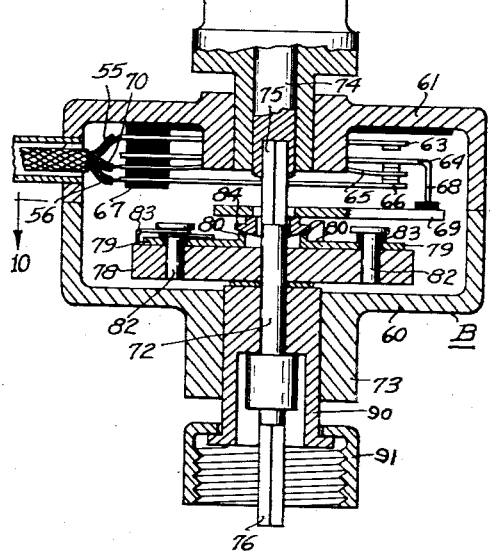
Fig. 8 is a sectional side view of the governor assembly showing the position and relation of the elements when the vehicle is not traveling.
Figure 9:
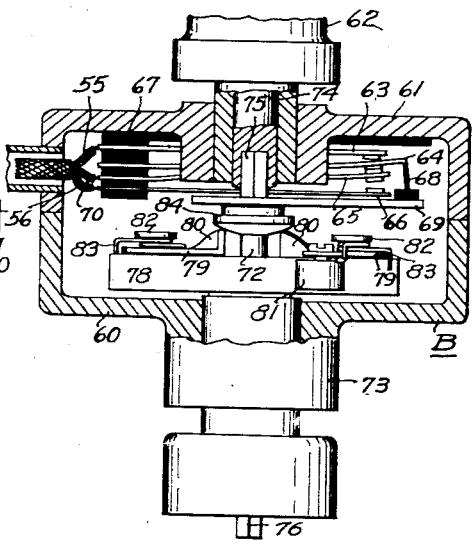
Fig. 9 is a side view, partially in section, of the same governor assembly showing the position of the elements when the vehicle is traveling at a moderate speed.

As soon as the vehicle starts moving and sufficient speed is imparted to the speedometer drive, the arm 64 of the governor control will be thrust from the position in Fig. 8 to that shown in Fig. 9. This will close the circuit from the vehicle battery through the contact arms 65 and 63 and conductor 55 to the solenoid coil 38. This energizing of the solenoid coil 38 will immediately cause the bracket arm 33 to be pushed outwardly from the clockwork mechanism, disengaging gear 31 from the gear 32 and permitting the segment-carrying arm 24 and indicating segment 23 to return to the normal out-of-view position by the spring member 35. This movement of the segment-carrying arm 24 however releases the trip arm 42 with the result that the trip arm 42 and switch 44 return to the normal position of Fig. 3. But this does not cause current to pass to the electric clockwork mechanism since the contact arms 65 and 66 are separated in the governor-controlled switch.

When the vehicle speed is increased (for example, when it is increased beyond 15 miles per hour), the contact arm 64 (Fig. 9) will be pushed upward still further until it is no longer contacted by the battery contact arm 65 and the arms 63, 64, 65 and 66 will be in the position illustrated in Fig. 9A. When this occurs the circuit to solenoid 38 is also broken, and, although this permits the bracket arm 33 to return to normal position, connecting gear 31 with gear 32, no operation of the indicator will occur since the circuit to the electric clockwork mechanism is open.

Thus, during such time as the vehicle is operated at a higher speed than a minimum predetermined speed, and during such periods as the vehicle remains parked beyond a predetermined parking time limit, no electric current at all will be consumed by my device.

It would of course be possible to make variations and modifications in the construction of various members and switches in my device, such as the governor-controlled switch which I have described, without departing from the principle of my invention. It is not my intention to limit my invention otherwise than as set forth in the claims.

I claim:

1. In a vehicle parking indicator of the character described, an electrically-driven mechanism, a source of electrical energy, a governor-controlled switch assembly having switch members connected with said source of electrical energy and the circuit to said electrically-driven mechanism respectively, the governor in said assembly operated by the speedometer drive of the vehicle, said assembly so arranged that said source of electrical energy will be connected to the circuit to said electrically-driven mechanism only when said governor is at rest.

2. In a vehicle parking meter, a movable parking indicator, an electric clockwork mechanism, connecting means adapted to connect said electric clockwork mechanism with said indicator, a vehicle battery, a governor-controlled switch assembly having switch members connected with said vehicle battery and the circuit to said electric clockwork mechanism respectively, the governor in said assembly operated by the speedometer drive of the vehicle, said assembly so arranged that said vehicle battery will be connected to the circuit to said electric clockwork mechanism only when said governor is at rest.

3. The combination set forth in claim 2 with the addition of a switch control in the circuit to said electric clockwork mechanism adapted to stop the operation of said electric clockwork mechanism when said indicator has been moved a predetermined distance by said electric clockwork mechanism.

4. In a vehicle parking meter of the character described, including a movable indicator and an electric clockwork mechanism for moving said indicator, connecting means adapted to connect said electric clockwork mechanism with said indicator, electrically-operated means for disconnecting said connecting means and thereby disconnecting said indicator from said electric clockwork mechanism, a vehicle battery, a governor-controlled switch assembly having switch members connected with said vehicle battery and the circuit to said electric clockwork mechanism and said electrically-operated disconnecting means respectively, the governor in said assembly operated by the speedometer drive of the vehicle, said assembly so arranged that said vehicle battery will be connected to said electrically-operated disconnecting means whenever said governor is driven at a moderate predetermined speed.

5. In a parking meter of the character described, including a movable indicator, an electric clockwork mechanism, connecting means adapted to connect said electric clockwork mechanism with said indicator, a solenoid for disconnecting said connecting means and thereby disconnecting said indicator from said electric clockwork mechanism, a vehicle battery, a governor-controlled switch assembly having switch members connected with said vehicle battery and the circuit to said electric clockwork mechanism and said solenoid respectively, the governor in said assembly operated by the speedometer drive of the vehicle, said assembly so arranged that said vehicle battery will be connected to the circuit to said electric clockwork mechanism only when said governor is at rest and will be connected to said solenoid only when said governor is driven at a moderate predetermined speed.

6. In a vehicle parking meter of the character described, a movable parking indicator, an electrically-driven mechanism for moving said indicator, a switch control in the circuit to said electrically-driven mechanism adapted to stop the operation of said electrically-driven mechanism when said indicator has been moved a predetermined distance by said electrically-driven mechanism, a source of electrical energy, a governor-controlled switch assembly having switch members connected with said source of electrical energy and the circuit to said electrically-driven mechanism respectively, the governor in said assembly operated by the speedometer drive of the vehicle, said assembly so arranged that said source of electrical energy will be connected to the circuit to said electrically-driven mechanism only when said governor is at rest.

7. In a vehicle, a movable parking indicator, an electric clockwork mechanism, gears adapted to connect said electric clockwork mechanism with said indicator, electrically-operated means for disconnecting said gears and thereby disconnecting said indicator from said electric clockwork mechanism, a switch control in the circuit to said electric clockwork mechanism adapted to be operated by said indicator to stop the operation of said electric clockwork mechanism when said indicator has been moved a predetermined distance by said electric clockwork mechanism, a vehicle battery, a governor-controlled switch assembly having switch members connected with said vehicle battery and the circuit to said electric clockwork mechanism and said electrically-operated disconnecting means respectively, the governor in said assembly operated by the speedometer drive of the vehicle, said assembly so arranged that said vehicle battery will be connected to the circuit to said electric clockwork mechanism only when said governor is at rest and will be connected to said electrically-operated disconnecting means only when said governor is driven at a moderate predetermined speed and neither the circuit to said electric clockwork mechanism nor said electrically-operated disconnecting means will be connected to said vehicle battery when said governor is driven at a higher rate of speed.

8. In a vehicle parking indicator of the character described, including a movable indicating member, an electrically-driven mechanism for moving said indicating member, connecting means adapted to connect said electrically-driven mechanism with said indicating member, a solenoid for disconnecting said connecting means and thereby disconnecting said indicating member from said electrically-driven mechanism, a switch control in the circuit to said electrically-driven mechanism adapted to stop the operation of said electrically-driven mechanism when said indicating member has been moved a predetermined distance by said electrically-driven mechanism, a source of electrical energy, a governor-controlled switch assembly having switch members connected with said source of electrical energy and the circuit to said electrically-driven mechanism and said electrically-operated disconnecting means respectively, said assembly so arranged that said source of electrical energy will be connected to the circuit to said electrically-driven mechanism only when said governor is at rest and will be connected to said electrically-operated disconnecting means when said governor is driven at a moderate predetermined speed.

9. A vehicle parking indicator of the character described, including a movable indicating member, an electrically-driven mechanism, connecting means adapted to connect said electrically-driven mechanism with said indicating member, a solenoid for disconnecting said connecting means and thereby disconnecting said indicating member from said electrically-driven mechanism, a source of electricaly energy, a governor-controlled switch assembly having switch members connected with said source of electrical energy and the circuit to said electrically-driven mechanism and said solenoid respectively, the governor in said assembly operated by the speedometer drive of the vehicle, said assembly so arranged that said source of electrical energy will be connected to the circuit to said electrically-driven mechanism only when said governor is at rest and will be connected to said solenoid only when said governor is driven at a moderate predetermined speed and neither the circuit to said electrically-driven clockwork mechanism nor said solenoid will be connected to said source of electrical energy when said governor is driven at a higher rate of speed.

10. A vehicle parking indicator including, a movable indicating member mounted on the outside of the vehicle, an electric clockwork mechanism located on the inside of the vehicle, gears adapted to connect said electric clockwork mechanism with said indicating member, a solenoid for disconnecting said gears and thereby disconnecting said indicating member from said electric clockwork mechanism, a switch control in the circuit to said electric clockwork mechanism adapted to be operated by said indicating member to stop the operation of said electric clockwork mechanism when said indicating member has been moved a predetermined distance by said electric clockwork mechanism, a vehicle battery, a governor-controlled switch assembly having switch members connected with said vehicle battery and the circuit to said electric clockwork mechanism and said solenoid, respectively, the governor in said assembly operated by the speedometer drive of the vehicle, said assembly so arranged that said vehicle battery will be connected to the circuit to said electric clockwork mechanism only when said governor is at rest and will be connected to said solenoid only when said governor is driven at a moderate predetermined speed and neither the circuit to said electric clockwork mechanism nor said solenoid will be connected to said vehicle battery when said governor is driven at a higher rate of speed.

JAMES HICKEY.